(12) United States Patent
Falconetti et al.

(10) Patent No.: US 10,674,531 B2
(45) Date of Patent: Jun. 2, 2020

(54) COLLISION HANDLING BETWEEN LEGACY TTI AND SHORT TTI

(71) Applicant: Telefonaktiebolaget LM Ericsson (publ), Stockholm (SE)

(72) Inventors: Laetitia Falconetti, Järfälla (SE); Daniel Larsson, Lund (SE); Mattias Andersson, Sundbyberg (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/088,795

(22) PCT Filed: Mar. 29, 2017

(86) PCT No.: PCT/SE2017/050301
§ 371 (c)(1),
(2) Date: Sep. 26, 2018

(87) PCT Pub. No.: WO2017/171615
PCT Pub. Date: Oct. 5, 2017

(65) Prior Publication Data
US 2019/0110311 A1    Apr. 11, 2019

Related U.S. Application Data

(60) Provisional application No. 62/316,964, filed on Apr. 1, 2016.

(51) Int. Cl.
*H04W 72/12* (2009.01)
*H04L 1/18* (2006.01)
(Continued)

(52) U.S. Cl.
CPC .......... *H04W 72/1284* (2013.01); *H04L 1/00* (2013.01); *H04L 1/1819* (2013.01);
(Continued)

(58) Field of Classification Search
CPC .................................................. H04W 72/1284
(Continued)

(56) References Cited

U.S. PATENT DOCUMENTS

2015/0333898 A1  11/2015  Ji et al.
2016/0095105 A1   3/2016  Chen et al.
(Continued)

FOREIGN PATENT DOCUMENTS

WO      2016040290 A1    3/2016

OTHER PUBLICATIONS

Ericsson, "R1-167503: Handling overlapping allocations with short and 1 ms TTI," Third Generation Partnership Projec (3GPP), TSG-RAN WG1 #86, Aug. 22-26, 2016, 2 pages, Goteborg, Sweden.
(Continued)

*Primary Examiner* — Peter G Solinsky
(74) *Attorney, Agent, or Firm* — Withrow & Terranova, PLLC

(57) ABSTRACT

Systems and methods for collision handling between transmissions using a first Transmission Time Interval (TTI) and transmissions using a second TTI, such as a legacy TTI and a short TTI (sTTI), are provided. In some embodiments, the proposed solution helps the UE handle collisions between transmissions using legacy TTI in UL and overlapping transmissions using short TTI in UL. In some embodiments, this is accomplished by a wireless device adapted for uplink transmissions using a first TTI or a second TTI where the second TTI is shorter than the first TTI. The method includes altering at least one transmission of a first transmission using the first TTI and a second transmission using the second TTI based on a determination that a collision is to occur between the first transmission and the second transmission.

15 Claims, 13 Drawing Sheets

(51) Int. Cl.
 H04L 5/00 (2006.01)
 H04L 1/00 (2006.01)
 H04W 72/04 (2009.01)
(52) U.S. Cl.
 CPC .......... H04L 1/1854 (2013.01); H04L 5/0053 (2013.01); H04L 5/0082 (2013.01); H04W 72/0446 (2013.01); H04W 72/0453 (2013.01); H04W 72/1247 (2013.01); H04W 72/1268 (2013.01); *H04L 5/001* (2013.01); *H04L 5/0023* (2013.01); *H04L 5/0048* (2013.01)
(58) Field of Classification Search
 USPC .......................................................... 370/329
 See application file for complete search history.

(56) References Cited

U.S. PATENT DOCUMENTS

| 2018/0227861 | A1* | 8/2018 | Byun | H04W 52/34 |
| 2018/0234998 | A1* | 8/2018 | You | H04W 72/042 |
| 2019/0104533 | A1* | 4/2019 | Kim | H04L 5/00 |

OTHER PUBLICATIONS

Huawei, et al., "R1-1612828: Handling collision between sPUCCH/PUCCH and PUSCH/sPUSCH," Third Generation Partnership Project (3GPP), TWG RAN WG1 Meeting #87, Nov. 14-18, 2016, 5 pages, Reno, USA.
Intel Corporation, "R1-160862: On multiplexing of PDSCH with different TTIs and related enhancements," Third Generation Partnership Project (3GPP), TSG RAN WG1 Meeting #84, Feb. 15-19, 2016, 3 pages, St. Julian's, Malta.
InterDigital Communications, "R1-161092: Support for Short TTIs in UL," Third Generation Partnership Project (3GPP), TSG-RAN WG1 #84, Feb. 15-19, 2016, 3 pages, St. Julian's, Malta.
LG Electronics, "R1-1611772: Discussion on collisions between TTI and sTTI," Third Generation Partnership Project (3GPP), TSG Ran WG1 Meeting #87, Nov. 14-18, 2016, 4 pages, Reno, USA.
Nokia Networks, et al., "R1-160798: Considerations of FDD DL HARQ for Supporting Latency Reduction," Third Generation Partnership Project (3GPP), TSG-RAN Meeting #84, Feb. 15-19, 2016, 4 pages, St. Julian's, Malta.
Qualcomm Incorporated, "R1-160906: TTI shortening and reduced processing time for UL transmission," Third Generation Partnership Project (3GPP), TSG RAN WG1 #84, Feb. 15-19, 2016, 5 pages, St. Julian's, Malta.
Qualcomm Incorporated, "R1-1702559: 1ms TTI and sTTI Collision in the Uplink," Third Generation Partnership Project (3GPP), TSG RAN WG1 #88, Feb. 13-17, 2017, 2 pages, Athens, Greece.
International Search Report and Written Opinion for International Patent Application No. PCT/SE2017/050301, dated May 4, 2017, 18 pages.
Extended European Search Report for European Patent Application No. 17775986.7, dated Sep. 19, 2019, 4 pages.

* cited by examiner

COLLISION HANDLING BETWEEN LEGACY TTI AND SHORT TTI

RELATED APPLICATIONS

This application is a 35 U.S.C. § 371 national phase filing of International Application No. PCT/SE2017/050301, filed Mar. 29, 2017, which claims the benefit of provisional patent application Ser. No. 62/316,964, filed Apr. 1, 2016, the disclosures of which are hereby incorporated herein by reference in their entireties.

TECHNICAL FIELD

The present disclosure relates to communication using a short Transmission Time Interval (sTTI).

BACKGROUND

Packet data latency is one of the performance metrics that vendors, operators, and end-users (via speed test applications) regularly measure. Latency measurements are done in all phases of a radio access network system lifetime: when verifying a new software release or system component, when deploying a system, when the system is in commercial operation, etc.

Better latency than previous generations of Third Generation Partnership Project (3GPP) Radio Access Technologies (RATs) is one performance metric that guided the design of Long-Term Evolution (LTE). LTE is now recognized by the end-users to be a system that provides faster access to internet and lower data latencies than previous generations of mobile radio technologies. However, since the introduction of LTE, several improvements have been introduced to increase data rates of the system: Carrier Aggregation, Multiple-Input-Multiple-Output (MIMO), etc. To get the full benefit of these data rate enhancements, continuous enhancements of the latency of LTE are needed in the future evolution track of LTE towards 5G.

Radio resource efficiency could be positively impacted by latency reductions. Lower packet data latency could increase the number of transmissions possible within a certain delay bound; hence higher Block Error Rates (BLER) targets could be used for the data transmissions, freeing up radio resources potentially improving the capacity of the system.

Therefore, one area to address when it comes to packet latency reduction is the reduction of transport time of data and control signaling by addressing the length of a Transmission Time Interval (TTI) and the reduction of processing time of control signaling (e.g. the time it takes for a User Equipment (UE) to process a grant signal).

One possible solution is to shorten the TTIs by introducing a short TTI (sTTI) concept. The shorter TTIs can have any time duration. As one example, the duration of the sTTI may be 0.5 ms. It is assumed that the UE and network processing related to e.g. Hybrid Automatic Repeat Request (HARQ) retransmissions can be reduced compared to the legacy TTI operation.

In the legacy operation, the HARQ feedback for a Physical Downlink Shared Channel (PDSCH) transmission in subframe n occurs in subframe n+4. For simplification, it can be assumed that the HARQ feedback delay for a short PDSCH (sPDSCH) can be scaled with the same factor as the sTTI length compared to the 1 ms TTI used today.

SUMMARY

Systems and methods for collision handling between transmissions using a first Transmission Time Interval (TTI) and transmissions using a second TTI, such as a legacy TTI and a short TTI (sTTI), are provided. In some embodiments, the proposed solution helps the UE handle collisions between transmissions using legacy TTI in uplink (UL) and overlapping transmissions using short TTI in UL. In some embodiments, this is accomplished by a wireless device adapted for uplink transmissions using a first TTI or a second TTI where the second TTI is shorter than the first TTI. The method includes altering at least one transmission of a first transmission using the first TTI and a second transmission using the second TTI based on a determination that a collision is to occur between the first transmission and the second transmission.

In some embodiments, a method of operating a wireless device adapted for uplink transmissions using a first TTI or a second TTI is disclosed, where the second TTI is shorter than the first TTI. The method includes altering at least one transmission of a first transmission using the first TTI and a second transmission using the second TTI based on a determination that a collision is to occur between the first transmission and the second transmission.

In some embodiments, the collision is either the first transmission using the first TTI on a PUCCH and the second transmission using the second TTI on a short Physical Uplink Control Channel (sPUCCH); the first transmission using the first TTI on a PUSCH and the second transmission using the second TTI on a short Physical Uplink Shared Channel (sPUSCH); the first transmission using the first TTI on the PUCCH and the second transmission using the second TTI on the sPUSCH; or the first transmission using the first TTI on the PUSCH and the second transmission using the second TTI on the sPUCCH.

In some embodiments, altering the at least one transmission includes mapping a Hybrid Automatic Repeat Request (HARQ) feedback planned for the first transmission onto a first subframe using second TTI with an sPUCCH resource. In some embodiments, mapping the HARQ feedback planned for the first transmission includes, if a single transport block is to be acknowledged in the HARQ feedback planned for the first transmission and the second transmission, transmitting an sPUCCH format able to carry two information bits; and, if a total number of HARQ bits to be reported is larger than two, transmitting the total number of HARQ bits using either spatial bundling or temporal bundling. In some embodiments, mapping the HARQ feedback planned for the first transmission includes, if the total number of HARQ bits to be reported is three, using channel selection; or, transmitting the HARQ feedback for all these transport blocks using an sPUCCH format that is able to carry more information than a simple sPUCCH format.

In some embodiments, mapping the HARQ feedback planned for the first transmission includes, if the wireless device has started to transmit the first transmission using the first TTI on the PUCCH and the wireless device wants to transmit a Scheduling Request (SR) over the sPUCCH, dropping the SR and transmitting the SR on a next SR opportunity where the wireless device is not transmitting using first TTI; if the wireless device has started to transmit the first transmission using the first TTI on the PUCCH and the wireless device wants to transmit the SR over the sPUCCH, stopping transmission of part of the first TTI prematurely and delaying the SR transmission on the next SR opportunity where the wireless device has stopped transmitting part of the first TTI; if the wireless device knows before transmitting the first transmission using the first TTI on the PUCCH that the wireless device wants to transmit the SR on the sPUCCH, transmitting only part of the first TTI and transmitting the SR on an SR opportunity where the wireless device is not transmitting part of first TTI; if the wireless device knows before transmitting the first transmission using the first TTI on the PUCCH that the wireless device wants to transmit the SR, and the wireless device has an available sPUCCH resource for an SR with enough bandwidth to transmit HARQ feedback, transmitting the HARQ feedback on the SR sPUCCH resource; or if the wireless device does not have such an SR sPUCCH of sufficient bandwidth available, transmitting the HARQ feedback on the first PUCCH and dropping the SR.

In some embodiments, mapping the HARQ feedback planned for the first transmission includes dropping a Channel-Quality Indicator (CQI) report and transmitting the HARQ feedback over the sPUCCH.

In some embodiments, altering the at least one transmission includes, if the wireless device has started to transmit the first transmission using the second TTI on the PUCCH and the wireless device wants to transmit the sPUCCH, stopping transmission of part of the PUCCH prematurely and transmitting the sPUCCH as originally planned at a time where the wireless device has stopped transmitting part of the PUCCH; or, if the wireless device knows before transmitting the first transmission using the first TTI on the PUCCH that the wireless device wants to transmit the sPUCCH, transmitting only part of the PUCCH and transmitting the sPUCCH where the wireless device is not transmitting part of PUCCH.

In some embodiments, altering the at least one transmission includes mapping the content of the sPUCCH to the PUSCH; mapping the content of the sPUCCH to part of a pre-defined HARQ/Rank Indicator (RI), /Precoding-Matrix Indicator (PMI) position in time depending on a planned transmission time of the sPUCCH; or transmitting multiple HARQ feedbacks by extending a number of resources usable for HARQ feedback along the reference symbol positions.

In some embodiments, the collision is to occur between the first transmission using the first TTI on the PUCCH and the second transmission using the second TTI on the sPUSCH, and altering the at least one transmission includes using similar rules as for a collision between a transmission on the sPUCCH and a transmission on the sPUSCH.

In some embodiments, altering the at least one transmission includes, if the wireless device notices an overlap before starting to transmit the first transmission using the first TTI on the PUSCH, dropping either the transmission of the PUSCH or the transmission of the sPUSCH. In some embodiments, the sPUSCH transmission is prioritized over the PUSCH and dropping either the transmission of the PUSCH or the transmission of the sPUSCH comprises dropping the transmission of the PUSCH. In some embodiments, the PUSCH transmission is prioritized over the sPUSCH and dropping either the transmission of the PUSCH or the transmission of the sPUSCH comprises dropping the transmission of the sPUSCH.

In some embodiments, a method of operating a network node adapted to receive uplink transmissions using a first TTI or a second TTI where the second TTI is shorter than the first TTI includes altering at least one transmission of a first transmission using the first TTI and a second transmission using the second TTI based on a determination that a collision is to occur between the first transmission and the second transmission.

In some embodiments, a wireless device includes at least one processor and memory. The memory includes instructions executable by the at least one processor whereby the wireless device is operable to alter at least one transmission of a first transmission using a first TTI and a second transmission using a second TTI where the second TTI is shorter than the first TTI, based on a determination that a collision is to occur between the first transmission and the second transmission.

In some embodiments, a network node includes at least one processor and memory. The memory includes instructions executable by the at least one processor whereby the network node is operable to alter at least one transmission of a first transmission using a first TTI and a second transmission using a second TTI where the second TTI is shorter than the first TTI, based on a determination that a collision is to occur between the first transmission and the second transmission.

In some embodiments, a wireless device is adapted to alter at least one transmission of a first transmission using a first TTI and a second transmission using a second TTI where the second TTI is shorter than the first TTI, based on a determination that a collision is to occur between the first transmission and the second transmission.

In some embodiments, a network node is adapted to alter at least one transmission of a first transmission using a first TTI and a second transmission using a second TTI where the second TTI is shorter than the first TTI, based on a determination that a collision is to occur between the first transmission and the second transmission.

In some embodiments, a computer program includes instructions which, when executed on at least one processor, cause the at least one processor to carry out the method according to any one of the embodiments discussed above. In some embodiments, a carrier containing the computer program is one of an electronic signal, an optical signal, a radio signal, or a computer readable storage medium.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
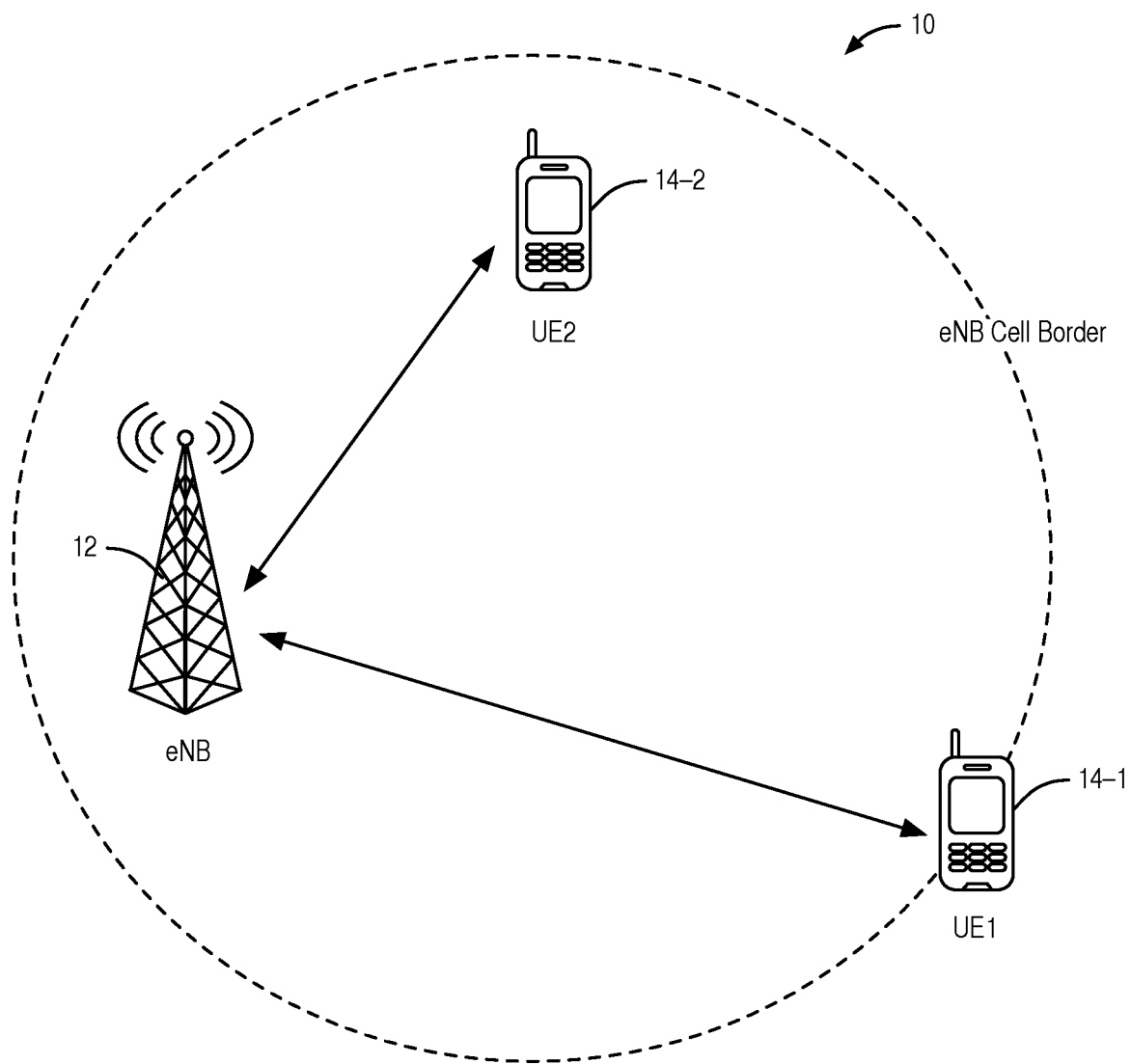
FIG. 1 illustrates a wireless communications network, according to some embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

A User Equipment (UE) supporting two or more different Transmission Time Intervals (TTIs) must be able to switch between the different TTIs over time. For convenience, these will be referred to herein as a first TTI and a second TTI, without the current disclosure being limited thereto. In addition, since these two TTIs are different, one must be longer and the other one must be shorter. For convenience, the discussion herein will assume that the second TTI is shorter than the first TTI. However, embodiments covering the reverse situation are also covered where appropriate.

In some specific embodiments, the first TTI is a legacy TTI that is equal to 1 millisecond (ms) as defined in current $3^{rd}$ Generation Partnership Project (3GPP) specifications. In these examples, the second TTI is shorter than this legacy TTI and is referred to as a short Transmission Time Interval (sTTI). As one example, the duration of the sTTI may be 0.5 ms. Or, the duration of the sTTI may be some fraction of the legacy TTI such as one-seventh or one-fourteenth. While the embodiments described herein focus on this legacy TTI and sTTI, the embodiments and concepts disclosed herein may be used in any suitable situation where a UE is adapted for Uplink (UL) transmissions using at least a first TTI and a second TTI.

At some point in time, the UE is served using sTTI, while at some other time it may be served using legacy TTI, or any first TTI and second TTI as discussed above. Due to the reduced processing time for sTTI, some UL sTTI transmissions may occur in the same subframe as a legacy UL transmission. For instance, a Hybrid Automatic Repeat Request (HARQ) feedback transmission on short Physical Uplink Control Channel (sPUCCH) may happen in the same subframe as a HARQ feedback transmission on the legacy Physical Uplink Control Channel (PUCCH) (referred to herein simply as PUCCH). Similar collisions exist between other UL channels like collision between short Physical Uplink Shared Channel (sPUSCH) and PUCCH, or between sPUCCH and Physical Uplink Shared Channel (PUSCH), or between sPUSCH and PUSCH. In order not to break the single carrier property in Long Term Evolution (LTE) UL, rules must be defined for UEs to solve the collisions.

While the terms PUCCH, sPUCCH, PUSCH, and sPUSCH are used herein, the embodiments of the current disclosure are not limited thereto. For instance, these may refer generally to, respectively, a control channel for the first TTI, a control channel for the second TTI, a shared or data channel for the first TTI, and a shared or data channel for the second TTI.

The embodiments disclosed herein in the case of simultaneous UL transmission using more than one TTI allow the UE to handle these collisions.

In FIG. 1, eNB 12 is shown serving a first UE 14-1 and a second UE 14-2. While the term UE is generally used herein, a UE may be any type of wireless device which is capable of at least communication through wireless communication. Examples of such UEs are sensors, modems, smart phones, Machine Type Communication (MTC) devices also referred to as Machine-to-Machine (M2M) devices, PDAs, iPads, tablets, Laptop Embedded Equipment (LEE), Laptop Mounted Equipment (LME), Universal Serial Bus (USB) dongles etc.

Notably, much of the discussion herein focuses on embodiments in which the wireless communications network 10 is a 3GPP LTE cellular communications network. As such, 3GPP terminology is oftentimes used herein. However, while the embodiments described herein focus on 3GPP LTE, the embodiments and concepts disclosed herein may be used in any suitable type of existing or future cellular communications network including, for example, $3^{rd}$ Generation (3G) networks (e.g. Universal Mobile Telecommunications System (UMTS)), $4^{th}$ Generation (4G) networks (Worldwide Interoperability for Microwave Access (Wi-MAX), LTE, Long Term Evolution Advanced (LTE-A)), $5^{th}$ Generation (5G) or other future networks.

In the following sub-sections, rules are defined so that UEs can handle collisions between legacy UL channels and short TTI UL channels that may happen. In some instances, only one or a few of these embodiments may be implemented.

In some embodiments, the legacy channels are prioritized over the short TTI channel. Legacy operation indeed ensures wide coverage and robustness towards varying conditions for users. Since sTTI may reduce the coverage of the cell, a user moving from good to bad conditions should be able to always rely on the legacy operation. Therefore, it may not be preferable to drop the transmission of a legacy channel. If a transmission of a sTTI channel in UL occurs in the same subframe as the transmission of a legacy UL channel, the short TTI transmission in UL is aborted.

However, these embodiments induce increased latency for the application served over sTTI, as the dropped sTTI UL transmission will have to be rescheduled by the eNB (over legacy channel or the same sTTI channel) and Downlink (DL) retransmissions may have to take place.

To minimize the information loss due to overlap between legacy UL transmission and short TTI UL transmission and to minimize the latency for the application served over short TTI, further rules are proposed in the following sections.

Figure 2:
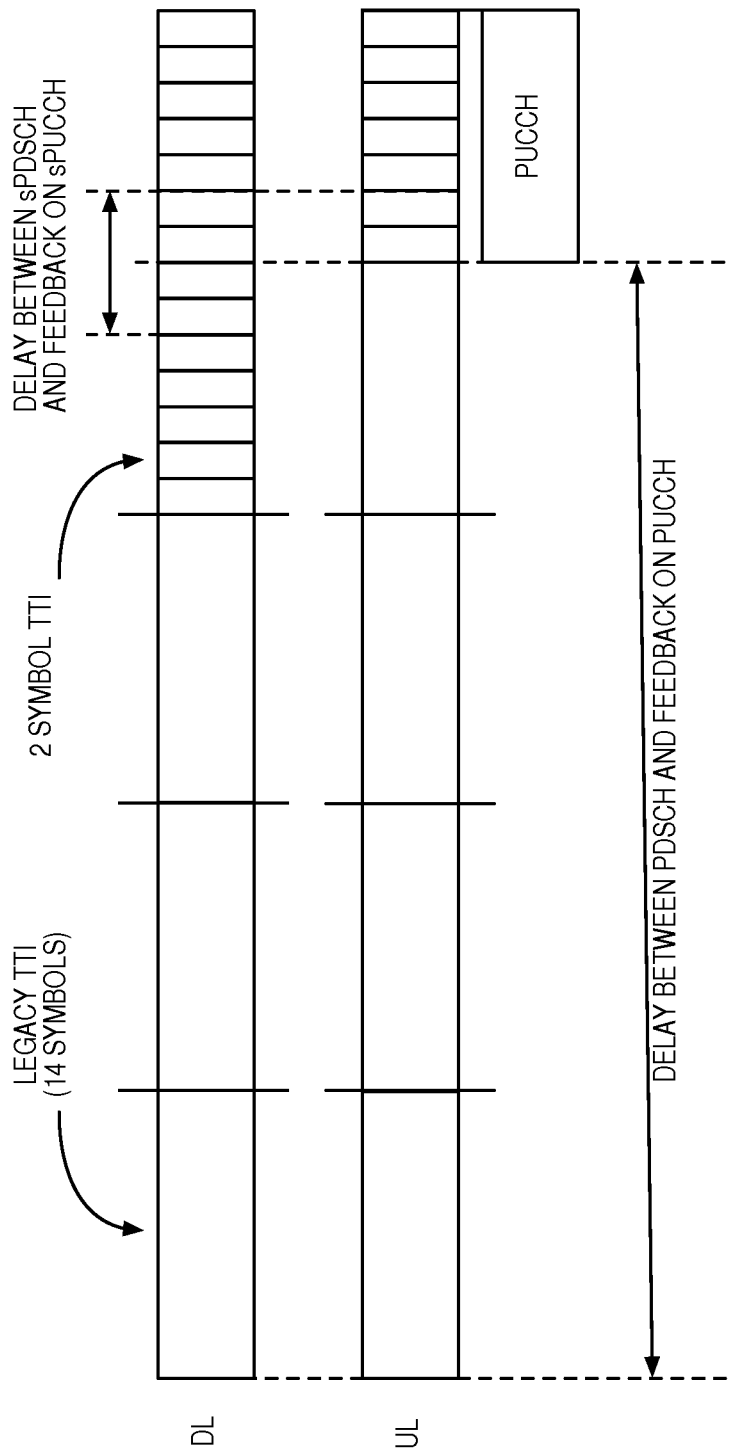
FIG. 2 illustrates a situation of a collision between Physical Uplink Control Channel (PUCCH) and short Physical Uplink Control Channel (sPUCCH), according to some embodiments of the present disclosure.

FIG. 2 illustrates a situation of a collision between PUCCH and sPUCCH, according to some embodiments of the present disclosure. In FIG. 2, the transmission of sPUCCH and PUCCH from the same UE would happen in the same subframe. In some embodiments, non-contiguous Physical Resource Blocks (PRBs) can be used for PUCCH and sPUCCH. However, in order to not break the single carrier property of LTE UL, PUCCH and sPUCCH should not be transmitted at the same time. Therefore, rules are defined so that the UE knows what to do in case of collision between PUCCH and sPUCCH transmission.

The following cases lead to collision between PUCCH and sPUCCH transmissions at the same UE:

1. A UE has received legacy TTI DL data 4 subframes ago and sTTI DL data after that.

2. A UE has received legacy TTI DL data 4 subframes ago, and sends a fast Scheduling Request (SR) over sPUCCH.

3. A UE has received sTTI DL data and should transmit a Channel-Quality Indicator (CQI) report on PUCCH.

Handling Case 1:

In some embodiments, the eNB knows from the timing relation between PDSCH and PUCCH and the one between sPDSCH and sPUCCH that a collision will occur. With the following rules, the eNB is able to interpret the HARQ feedback for the corresponding PDSCH and sPDSCH.

PUCCH can be used to carry different types of information: HARQ feedback, SR, CQI feedback. Different PUCCH formats with different maximum payloads are defined to be able to carry the different information types.

PUCCH format 1/1a/1b is suitable for transmitting HARQ feedback and SR.

PUCCH format 2 is dedicated to the transmission of CQI reports.

PUCCH format 3 supports the HARQ feedback for multiple carrier components when carrier aggregation is configured for a UE.

It can be expected that different formats with different maximum payloads will be supported for sPUCCH.

HARQ feedback can be bundled so that an AND operation is performed on multiple HARQ bits and only one bit is transmitted. The bundling can either be in the spatial domain, meaning that HARQs for two or more layers are bundled, or in the time domain, meaning that HARQs from multiple TTIs are bundled.

To handle case 1, in some embodiments, the HARQ feedback planned for PUCCH is mapped on the first sTTI with an sPUCCH resource in the subframe where the collision occurs. If a single transport block is to be acknowledged in PUCCH and sPUCCH, an sPUCCH format able to carry two information bits is sufficient. If the number of HARQ bits to be reported is larger than two, then bundling can be applied, either spatial bundling or temporal bundling. This is realized, for instance, by applying an AND operation. A transmitted 1 means that all transport blocks were positively acknowledged. A transmitted 0, however, has some ambiguity on the identity and number of the transport blocks that failed.

To remove ambiguity, other methods could be used. If three transport blocks are to be acknowledged (one sent in PDSCH and two in sPDSCH or vice-versa), channel selection is a good option. If the eNB has configured the choice between two sPUCCH resources, each being able to carry two information bits, a rule can be defined regarding the selection of the sPUCCH resource by the UE. If the UE transmits the HARQ feedback for the DL data channel with two transport blocks (e.g. sPDSCH) on sPUCCH resource 1, it is implicitly assumed that the HARQ feedback for the other DL data channel with one transport block (e.g. PDSCH) is positive. If sPUCCH resource 2 is selected, a negative HARQ feedback for the DL data channel with one transport block is assumed.

There are also cases where two or more transport blocks need to be acknowledged for PDSCH and sPDSCH in the same UL subframe. In this case of high payload, another rule can be defined where the UE transmits the HARQ feedback for all these transport blocks using an sPUCCH format that is able to carry more information than the simple sPUCCH format. Similar formats exist for PUCCH. For instance, for carrier aggregation PUCCH, format 3 is used. A similar high payload format will be specified for sPUCCH. In case of sPUCCH and PUCCH collision in the same subframe, the UE autonomously select the high payload format in the following cases:

If 3 or more transport blocks need to be acknowledged and channel selection is not defined; or if 4 or more transport blocks need to be acknowledged and channel selection is defined.

Handling Case 2:

In case 2, a UE has received legacy TTI DL data 4 subframes ago, and sends a fast SR over sPUCCH. In case 2, there are different possibilities. In some embodiments, if the UE has started to transmit a legacy PUCCH when it wants to transmit an SR over sPUCCH, it drops the SR and transmits it on the next SR opportunity where it is not transmitting legacy PUCCH. If the UE knows before transmitting the legacy PUCCH that it wants to transmit an SR, and it has an available sPUCCH resource for SR with enough bandwidth to transmit HARQ, then it transmits its HARQ feedback on the SR sPUCCH resource. If the UE does not have such an SR sPUCCH of sufficient bandwidth available, then it transmits its HARQ feedback on legacy PUCCH and drops the SR. It then transmits the SR on the next SR opportunity where it is not transmitting legacy PUCCH.

Handling Case 3:

In case 3, if the UE should transmit a CQI report using PUCCH format 2, in some embodiments it drops its CQI report regardless of whether it has started transmitting it or not and transmits its HARQ feedback over the sPUCCH.

In some embodiments where the collision is between PUCCH and sPUCCH, there is no mapping, but a partial drop instead. In some embodiments, altering the at least one transmission includes, if the wireless device has started to transmit the first transmission using the second TTI on the PUCCH and the wireless device wants to transmit the sPUCCH, stopping transmission of part of the PUCCH prematurely and transmitting the sPUCCH as originally planned at a time where the wireless device has stopped transmitting part of the PUCCH. In some embodiments, altering the at least one transmission includes, if the wireless device knows before transmitting the first transmission using the first TTI on the PUCCH that the wireless device wants to transmit the sPUCCH, transmitting only part of the PUCCH and transmitting the sPUCCH where the wireless device is not transmitting part of PUCCH. In some embodiments, these options are for the case where a PUCCH is expected by the wireless device and it collides with a sPUCCH transmission from the same wireless device. Since PUCCH transmission is composed of two slots, the one slot that collides with sPUCCH could be dropped, and could transmit sPUCCH instead. In most cases, the eNB is still able to recover the information from PUCCH based on only one slot.

Figure 3:
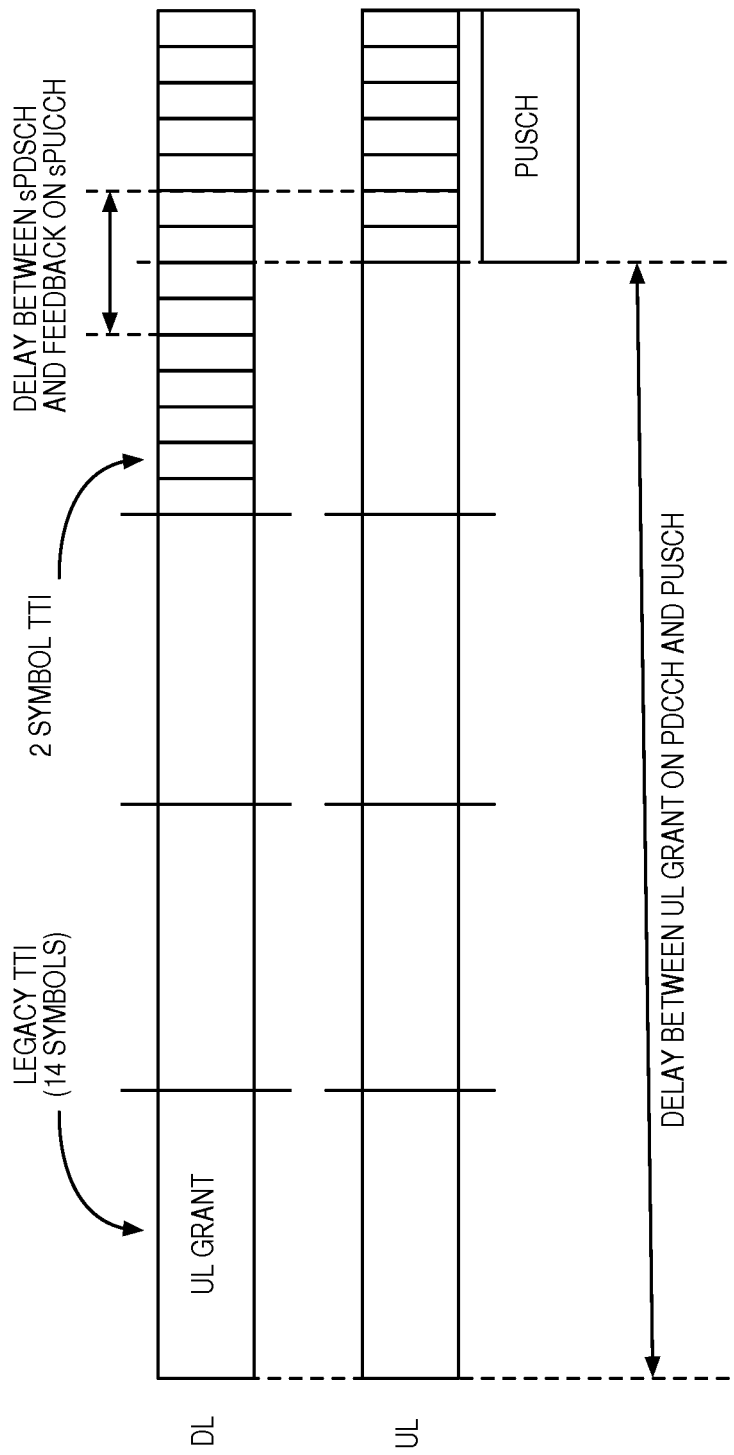
FIG. 3 illustrates a situation of a collision between Physical Uplink Shared Channel (PUSCH) and short Physical Uplink Shared Channel (sPUSCH), according to some embodiments of the present disclosure.

FIG. 3 illustrates a situation of a collision between PUSCH and sPUCCH according to some embodiments of the present disclosure. One case where this happens is when a PUSCH has been scheduled subframes ahead, and in the meantime an sPDSCH is transmitted. This creates the collision due to shorter delay between an sPDSCH transmission and the corresponding HARQ feedback on sPUCCH.

Figure 4:
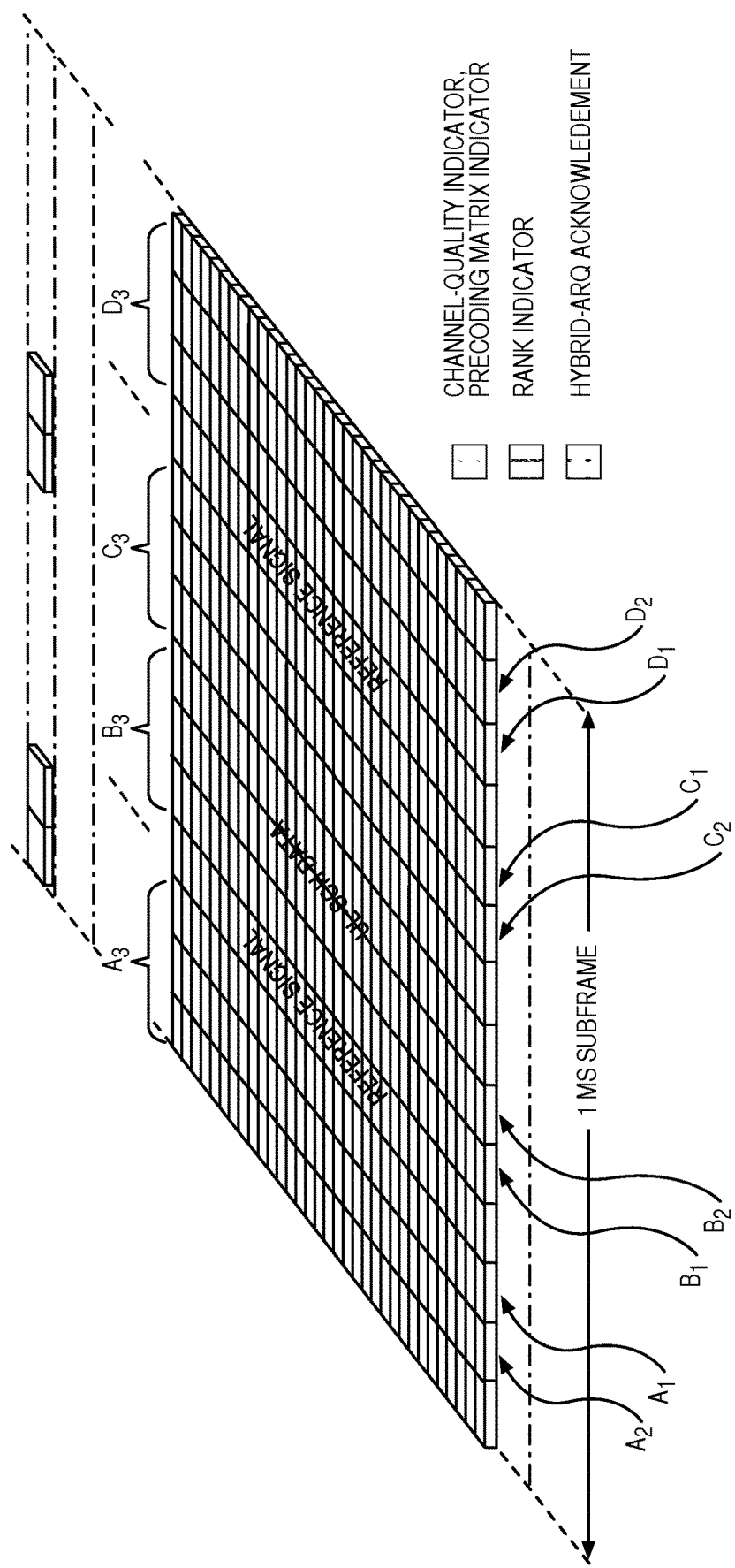
FIG. 4 illustrates a mapping of PUCCH content to PUSCH resources, according to some embodiments of the present disclosure.

If an sPUCCH transmission is expected in the same subframe as a legacy PUSCH transmission, the UE should map the content of sPUCCH to PUSCH. FIG. 4 illustrates a mapping of PUCCH content to PUSCH resources, according to some embodiments of the present disclosure. The HARQ feedback is mapped to the resource elements the closest to the reference symbols, the Rank Indicator (RI) is one Single Carrier-Frequency Division Multiple Access (SC-FDMA) symbol further apart, and the CQI report is mapped at the other extremity of the PUSCH frequency allocation. In case of sPUCCH mapping to PUSCH resource, the latency aspect has to be considered.

If the mapping specified for PUCCH to PUSCH is reused for sPUCCH, additional delay is introduced before the eNB receives the content of the mapped sPUCCH. For example, sPUCCH can be two symbols long and collide with the beginning of the subframe, but the eNB has to wait for one of the last SC-FDMA symbol where the rank indicator is mapped. So, the current mapping is not optimized from a latency point of view when used in combination with sTTI.

To optimize latency in case of sPUCCH/PUSCH collision, the content of sPUCCH should be mapped to part of the pre-defined HARQ/RI/Precoding-Matrix Indicator (PMI) positions in time depending on when the planned transmission time of sPUCCH. FIG. 4 shows that the HARQ feedback/RI/PMI positions are grouped in four regions. The A region spans the first three SC-FDMA symbols of PUSCH, the B region spans the three SC-FDMA symbols following the first reference symbol position in the subframe, and so on for regions C and D as depicted in FIG. 4. Each region is composed of three sub-regions to distinguish RI, HARQ and PMI HARQ feedback positions. The idea is to map the content of sPUCCH to the region where its transmission time was initially planned. For example, the HARQ feedback of sPUCCH is mapped to the resource elements in $A_1$, the RI to $A_2$ and the PMI to $A_3$, if the transmission time of sPUCCH was planned to be one of the first three SC-FDMA symbols of the subframe.

In some embodiments, the eNB can anticipate collision between sPUCCH and PUSCH and provide a sufficiently large allocation from the eNB side to map the content of sPUCCH to only a few SC-FDMA symbols of PUSCH. For instance, transmission of multiple HARQ feedbacks can be supported by extending the number of resources usable for HARQ feedback along the reference symbol positions (regions $A_1$, $B_1$, $C_1$, and $D_1$).

In other embodiments, if the sTTI length of PUCCH is 7 Orthogonal Frequency Division Multiplexing (OFDM) symbols, then that Uplink Control Information (UCI) mapping could be to region A and B combined, respectively, and to region C and D combined.

Figure 5:
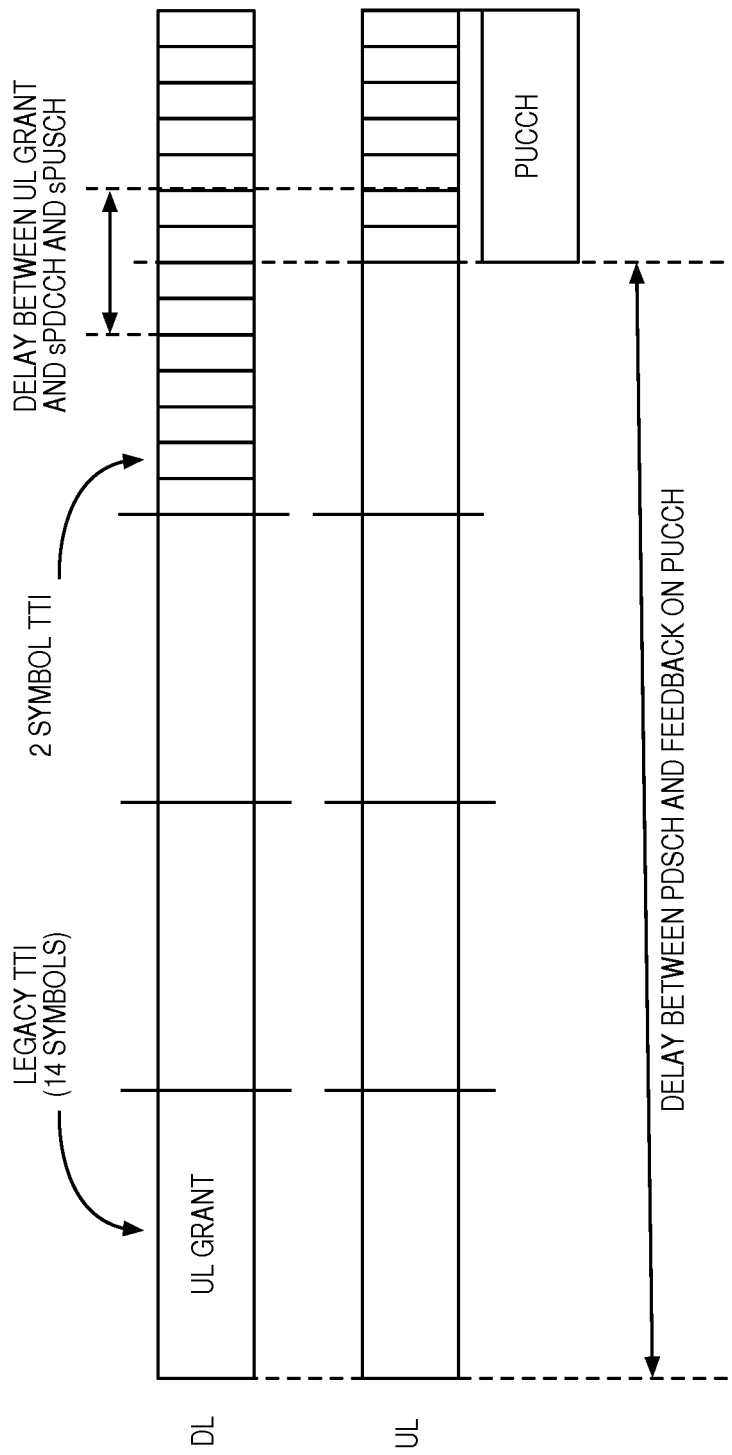
FIG. 5 illustrates a situation of a collision between PUCCH and sPUSCH, according to some embodiments of the present disclosure.

FIG. 5 illustrates a situation of a collision between PUCCH and sPUSCH, according to some embodiments of the present disclosure. Due to shorter processing delay for the sTTI channels, an sPUSCH could be scheduled in the same subframe where a PUCCH is required to carry HARQ feedback for a legacy PDSCH. If a PUCCH/sPUSCH collision occurs, similar rules as for an sPUCCH/sPUSCH collision can be used. The UE should map the content of PUCCH to sPUSCH in a similar way as the content of sPUCCH is mapped to sPUSCH. In some embodiments, since the eNB can anticipate a PUCCH/sPUSCH collision, it can allocate more resource blocks for sPUSCH transmission.

In regard to collisions between legacy PUSCH and sPUSCH, the eNB is in charge of scheduling UL data transmissions. Thus, in some embodiments, the eNB is able to avoid the situation where an sPUSCH transmission is scheduled in the same subframe as a legacy PUSCH transmission for the same UE. It is sufficient to keep track of the subframes where the UE was scheduled on PUSCH.

Figure 6:
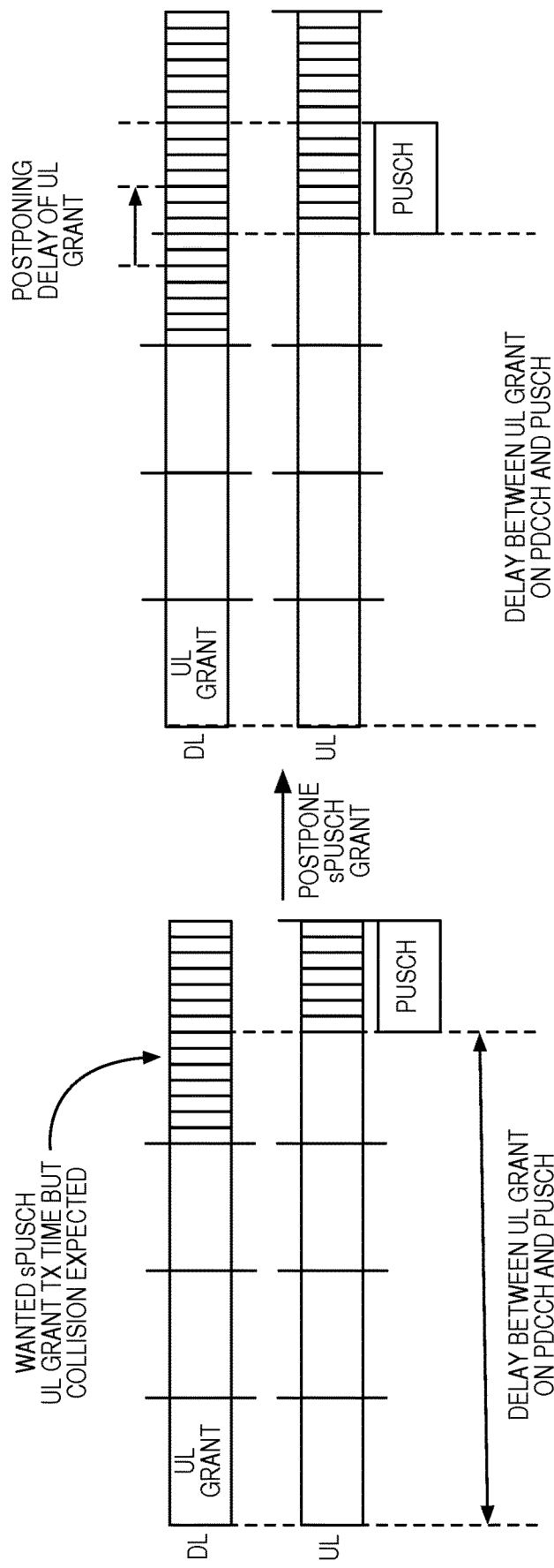
FIG. 6 illustrates abortion of PUSCH or sPUSCH transmission due to collision, according to some embodiments of the present disclosure.

When deciding on an sPUSCH transmission, the eNB should check whether this sPUSCH will overlap with an already planned PUSCH transmission. If that is the case, the transmission of the grant for sPUSCH is postponed so that the overlap of PUSCH and sPUSCH does not occur, as shown in FIG. 6.

However, in some embodiments, an overlap of PUSCH and sPUSCH occurs due to erroneous eNB scheduling, and if the UE notices the overlap before the transmission of legacy PUSCH is started, the UE may drop either the transmission of PUSCH or the transmission of sPUSCH.

Figure 7:
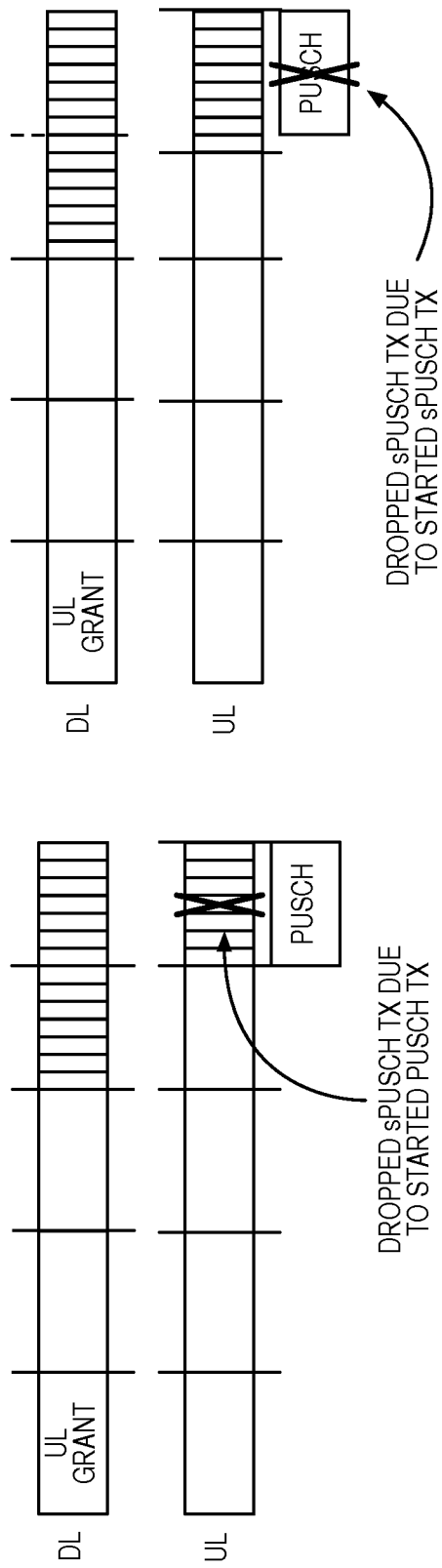
FIG. 7 illustrates postponing an Uplink (UL) grant to avoid PUSCH and sPUSCH collision, according to some embodiments of the present disclosure.

FIG. 7 illustrates abortion of PUSCH or sPUSCH transmission due to collision, according to some embodiments of the present disclosure. The right part of FIG. 7 shows an embodiment where sPUSCH transmission is prioritized over PUSCH with the reasoning that the sTTI may support time critical services. In the example of FIG. 7, the UE may not always be able to detect the overlap of PUSCH and sPUSCH before the transmission of legacy PUSCH is started if, for instance, the grant for sPUSCH is received too late. In that case, the sPUSCH transmission is dropped, as shown on the left part of FIG. 7.

In other embodiments, as discussed above, it may be preferable to prioritize PUSCH over sPUSCH to guarantee proper legacy operation. In some embodiments, a configuration parameter can be defined that will indicate to the UE which of the legacy channels or the short TTI channels to prioritize.

Figure 8:
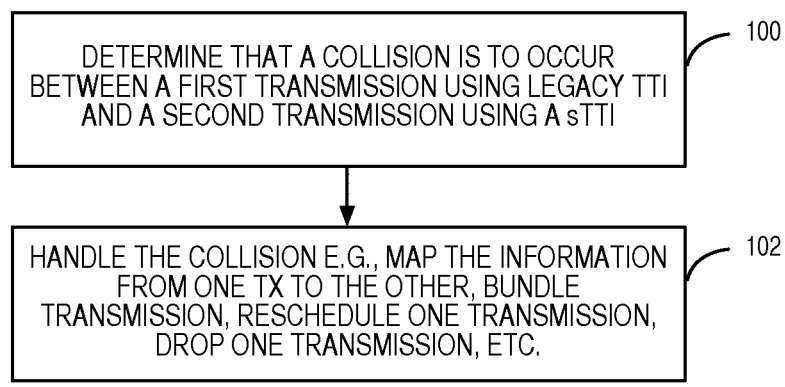
FIG. 8 illustrates a method of operation of a wireless device, according to some embodiments of the present disclosure.

FIG. 8 illustrates a method of operation of a wireless device such as UE 14. First, the wireless device determines that a collision is to occur between a first transmission using legacy TTI and a second transmission using a sTTI (step 100). The wireless device is aware of this collision since it is scheduled to make both of the transmissions. Next, the wireless device handles the collision (step 102). This may be accomplished in any of the ways discussed above and will depend on the type of transmissions involved in the collision, how much advance notice the wireless device has of the collision, and the priorities set for the different types of transmissions.

In some embodiments, this handling is accomplished by altering at least one transmission of a first transmission using the first TTI and a second transmission using the second TTI based on the determination that a collision is to occur between the first transmission and the second transmission. This altering may be, but is not limited to, re-scheduling one or both of the transmissions, dropping one or both of the transmissions, only partially transmitting one or both of the transmissions, combining the two transmissions, et cetera.

Figure 9:
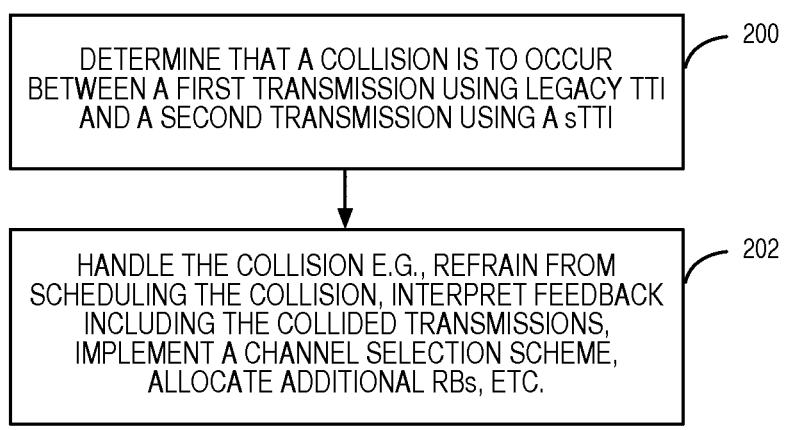
FIG. 9 illustrates a method of operation of a network node, according to some embodiments of the present disclosure.

FIG. 9 illustrates a method of operation of a network node such as eNB 12. First, the network node determines that a collision is to occur between a first transmission using legacy TTI and a second transmission using a sTTI for a wireless device served by the network node (step 200). The network node is aware of some collisions since it scheduled the transmissions which caused the collision. Next, the network node handles the collision (step 202). This may be accomplished in any of the ways discussed above and will depend on the type of transmissions involved in the collision, how much advance notice the network node has of the collision, and the priorities set for the different types of transmissions.

In some embodiments, this handling is accomplished by altering at least one transmission of a first transmission using the first TTI and a second transmission using the second TTI based on the determination that a collision is to occur between the first transmission and the second transmission. This altering may be, but is not limited to, re-scheduling one or both of the transmissions, not receiving one or both of the transmissions, only partially receiving one or both of the transmissions, receiving a combination of the two transmissions, et cetera.

Figure 10:
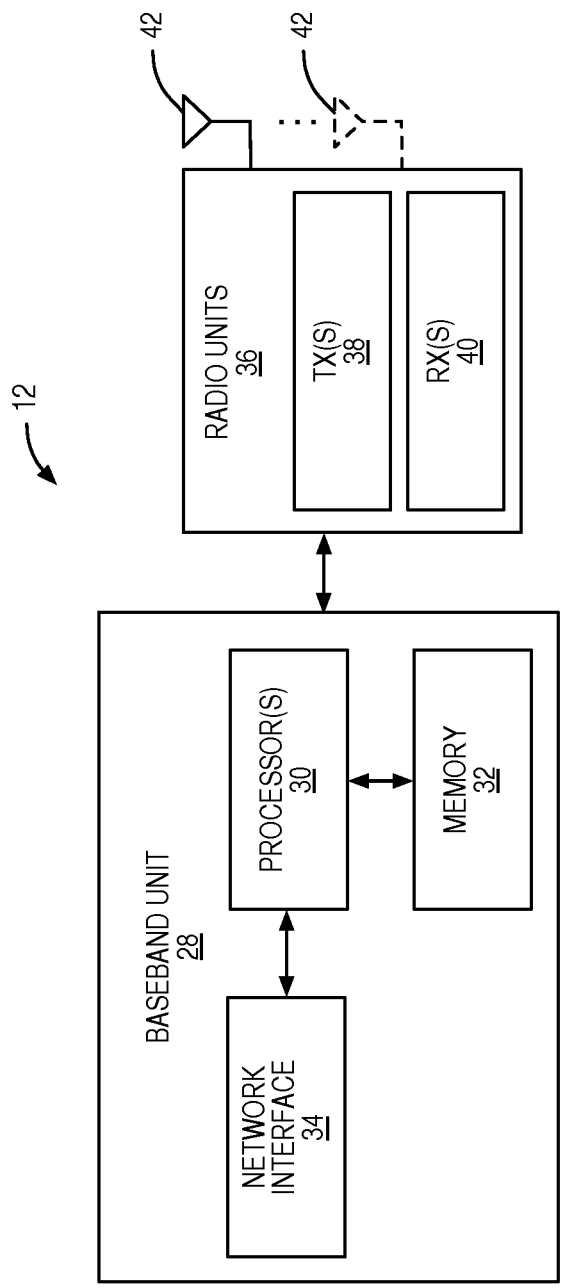
FIG. 10 is a diagram of a network node according to some embodiments of the present disclosure.

FIG. 10 is a diagram of a network node 12 according to some embodiments of the present disclosure. As used herein, this network node 12 may be a Base Station (BS) 12, an eNB 12, or any other network node capable of performing the processes discussed herein. In some embodiments, the network node 12 includes circuitry containing instructions, which when executed, cause the network node 12 to implement the methods and functionality described herein. In one example, the circuitry can be in the form of processing means which may include a processor and a memory containing instructions. As illustrated, the network node 12 includes a baseband unit 28 that includes at least one processor 30 and memory 32. The baseband unit 28 also includes a network interface 34. As illustrated, the network node 12 also includes a radio unit 36 with one or more transmitters 38, one or more receivers 40, and one or more antennas 42. In some embodiments, the network node 12, or the functionality of the network node 12 described with respect to any one of the embodiments described herein, is implemented in software that is stored in, e.g., the memory 32 and executed by the processor 30. The network interface 34 may include one or more components (e.g., network interface card(s)) that connect the network node 12 to other systems.

In some embodiments, a computer program including instructions which, when executed by the at least one processor 30, causes the at least one processor 30 to carry out the functionality of the network node 12 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 11:
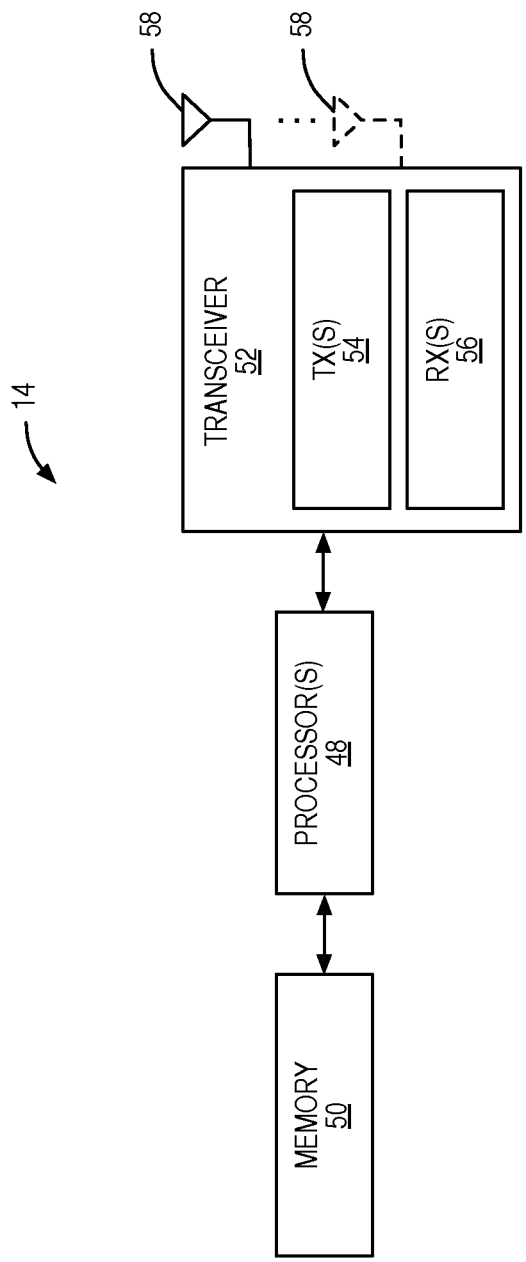
FIG. 11 is a diagram of a wireless device according to some embodiments of the present disclosure.

FIG. 11 is a diagram of a wireless device according to some embodiments of the present disclosure. As used herein, this wireless device 14 may be a UE 14 or any other device capable of performing the processes discussed herein. As illustrated, the wireless device 14 includes at least one processor 48 and memory 50. The wireless device 14 also includes a transceiver 52 with one or more transmitters 54, one or more receivers 56, and one or more antennas 58. In some embodiments, wireless device 14, or the functionality of the wireless device 14 described with respect to any one of the embodiments described herein, is implemented in software that is stored in, e.g., the memory 50 and executed by the processor 48. The transceiver 52 uses the one or more antennas 58 to transmit and receive signals and may include one or more components that connect the wireless device 14 to other systems.

In some embodiments, a computer program including instructions which, when executed by at least one processor 48, causes the at least one processor 48 to carry out the functionality of the wireless device 14 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 50).

Figure 12:
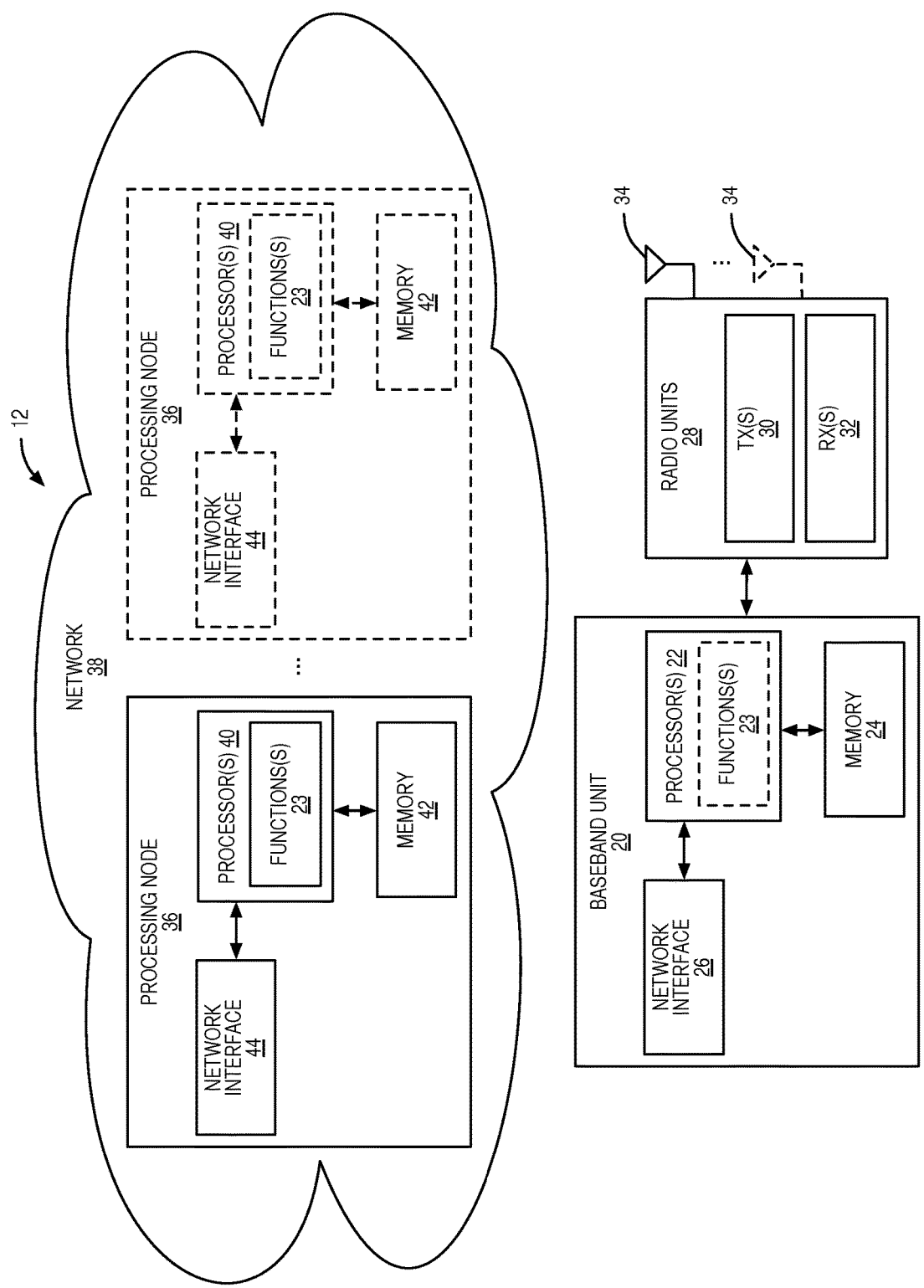
FIG. 12 is a schematic block diagram that illustrates a virtualized embodiment of a network node, according to some embodiments of the present disclosure.

FIG. 12 is a schematic block diagram that illustrates a virtualized embodiment of the base station 12 according to some embodiments of the present disclosure. This discussion is equally applicable to other types of radio access nodes. Further, other types of network nodes may have similar architectures (particularly with respect to including processor(s), memory, and a network interface).

As used herein, a "virtualized" radio access node is a radio access node in which at least a portion of the baseband functionality of the base station is implemented as a virtual component (e.g., via a virtual machine(s) executing on a physical processing node(s) in a network(s)). As illustrated, the base station 12 includes a baseband unit 20 that includes one or more processors 22 (e.g., Central Processing Units (CPUs), Application Specific Integrated Circuits (ASICs), Field Programmable Gate Arrays (FPGAs), and/or the like), memory 24, and network interface 26 as well as the one or more radio units 28 each of which includes one or more transmitters 30 and one or more receivers 32 coupled to one or more antennas 34, as described above. The baseband unit 20 is connected to radio unit(s) 28 via, for example, an optical cable or the like. The baseband unit 20 is connected to one or more processing nodes 36 coupled to or included as part of a network(s) 38 via the network interface 26. Each processing node 36 includes one or more processors 40 (e.g., CPUs, ASICs, FPGAs, and/or the like), memory 42, and a network interface 44.

In this example, the functions 23 of the base station 12 described herein are implemented at the one or more processing nodes 36 or distributed across the baseband unit 20 and the one or more processing nodes 36 in any desired manner. In some particular embodiments, some or all of the functions 23 of the base station 12 described herein are implemented as virtual components executed by one or more virtual machines implemented in a virtual environment(s) hosted by the processing node(s) 36. As will be appreciated by one of ordinary skill in the art, additional signaling or communication between the processing node(s) 36 and the baseband unit 20 is used in order to carry out at least some of the desired functions such as, for example, transmitting the grant and/or transmitting the indication of the carrier mode of at least one carrier. Notably, in some embodiments, the baseband unit 20 may not be included, in which case the radio unit(s) 28 communicate directly with the processing node(s) 36 via an appropriate network interface(s).

In some embodiments, a computer program including instructions which, when executed by at least one processor, causes the at least one processor to carry out the functionality of a radio access node (e.g., a base station 12 or a relay node 18) or a node (e.g., a processing node 36) implementing one or more of the functions 23 of the radio access node in a virtual environment according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 13:
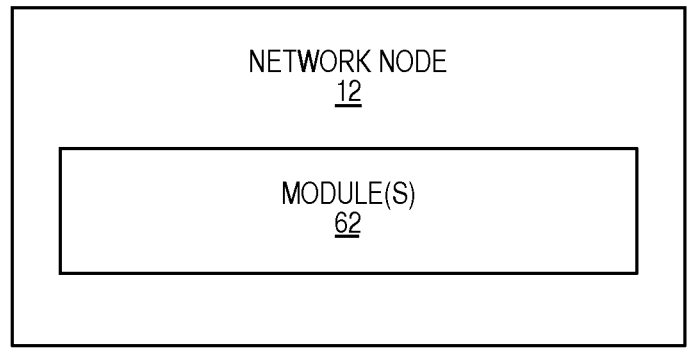
FIG. 13 is a block diagram of a network node including modules, according to some embodiments of the present disclosure.

FIG. 13 is a block diagram of a network node 12 (e.g., the base station 12) according to some other embodiments of the present disclosure. As illustrated, the network node 12 includes one or more modules 62, each of which is implemented in software. The module(s) 62 operate to provide the functionality of the network node 12 according to any of the embodiments described above with respect to FIG. 9. In some embodiments, the modules(s) 62 are operative to alter at least one transmission of a first transmission using a first TTI and a second transmission using a second TTI where the second TTI is shorter than the first TTI, based on a determination that a collision is to occur between the first transmission and the second transmission.

Figure 14:
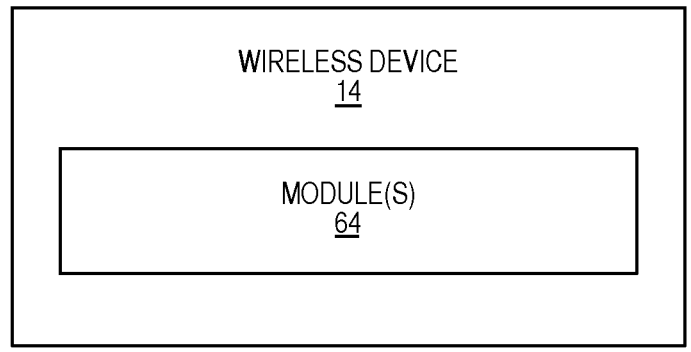
FIG. 14 is a block diagram of a wireless device including modules, according to some embodiments of the present disclosure.

FIG. 14 is a block diagram of a wireless device 14 (e.g., UE 14) according to some other embodiments of the present disclosure. As illustrated, the wireless device 14 includes one or more modules 64, each of which is implemented in software. The module(s) 64 operate to provide the functionality of the wireless device 14 according to any of the embodiments described above with respect to FIG. 8. In some embodiments, the modules(s) 64 are operative to alter at least one transmission of a first transmission using a first TTI and a second transmission using a second TTI where the second TTI is shorter than the first TTI, based on a determination that a collision is to occur between the first transmission and the second transmission.

The following acronyms are used throughout this disclosure.

3G 3rd Generation
3GPP 3rd Generation Partnership Project
4G Fourth Generation
5G Fifth Generation
ASIC Application Specific Integrated Circuit
BLER Block Error Rate
CPU Central Processing Unit
CQI Channel-Quality Indicator
DL Downlink
eNB evolved Node B
FPGA Field Programmable Gate Arrays
HARQ Hybrid Automatic Repeat Request
LEE Laptop Embedded Equipment
LME Laptop Mounted Equipment
LTE Long Term Evolution
LTE-A Long Term Evolution Advanced
M2M Machine-to-Machine
MIMO Multiple-Input-Multiple-Output
ms Millisecond
MTC Machine Type Communication
OFDM Orthogonal Frequency Division Multiplexing
PDCCH Physical Downlink Control Channel
PDSCH Physical Downlink Shared Channel
PMI Precoding-Matrix Indicator
PRB Physical Resource Block
PUCCH Physical Uplink Control Channel
PUSCH Physical Uplink Shared Channel
RAT Radio Access Technology
RI Rank Indicator
SC-FDMA Single Carrier-Frequency Division Multiple Access
sPDCCH short Physical Downlink Control Channel
sPDSCH short Physical Downlink Shared Channel
sPUCCH short Physical Uplink Control Channel
sPUSCH short Physical Uplink Shared Channel
SR Scheduling Request
sTTI short Transmission Time Interval
TTI Transmission Time Interval
UCI Uplink Control Information
UE User Equipment
UL Uplink
UMTS Universal Mobile Telecommunications System
USB Universal Serial Bus
WiMAX Worldwide Interoperability for Microwave Access Those skilled in the art will recognize improvements and modifications to the embodiments of the present disclosure. All such improvements and modifications are considered within the scope of the concepts disclosed herein and the claims that follow.

What is claimed is:

1. A method of operating a wireless device in a cellular communications network, the wireless device being adapted for uplink transmissions using a first Transmission Time Interval, TTI, or a second TTI where the second TTI is shorter than the first TTI, the method comprising:
   altering at least one transmission of a first transmission using the first TTI and a second transmission using the second TTI based on a determination that a collision is to occur between the first transmission and the second transmission, wherein determining that the collision is to occur comprises determining that the collision is to occur between at least one of the group consisting of:
      the first transmission using the first TTI on a Physical Uplink Control Channel, PUCCH, and the second transmission using the second TTI on a short Physical Uplink Control Channel, sPUCCH;
      the first transmission using the first TTI on a Physical Uplink Shared Channel, PUSCH, and the second transmission using the second TTI on a short Physical Uplink Shared Channel, sPUSCH;
      the first transmission using the first TTI on the PUCCH and the second transmission using the second TTI on the sPUSCH; and
      the first transmission using the first TTI on the PUSCH and the second transmission using the second TTI on the sPUCCH.

2. The method of claim 1 wherein determining that the collision is to occur comprises determining that the collision is to occur between the first transmission using the first TTI on the PUCCH and the second transmission using the second TTI on the sPUCCH, and altering the at least one transmission comprises:
   mapping a Hybrid Automatic Repeat Request, HARQ, feedback planned for the first transmission onto a first subframe using second TTI with an sPUCCH resource.

3. The method of claim 1 wherein determining that the collision is to occur comprises determining that the collision is to occur between the first transmission using the first TTI on the PUCCH and the second transmission using the second TTI on the sPUSCH, and altering the at least one transmission comprises using similar rules as for a collision between a transmission on the sPUCCH and a transmission on the sPUSCH.

4. The method of claim 1 wherein determining that the collision is to occur comprises determining that the collision is to occur between the first transmission using the first TTI on the PUSCH and the second transmission using the second TTI on the sPUSCH, and altering the at least one transmission comprises:
   responsive to the wireless device noticing an overlap before starting to transmit the first transmission using the first TTI on the PUSCH, dropping either the transmission of the PUSCH or the transmission of the sPUSCH.

5. A method of operating a network node in a cellular communications network, the network node being adapted to receive uplink transmissions using a first Transmission Time Interval, TTI, or a second TTI where the second TTI is shorter than the first TTI, the method comprising:
   altering at least one transmission of a first transmission using the first TTI and a second transmission using the second TTI based on a determination that a collision is to occur between the first transmission and the second transmission, wherein altering the at least one transmission comprises:
      interpreting a HARQ feedback received from a wireless device as corresponding to both a first transmission using first TTI on a Physical Downlink Shared Channel, PDSCH, and a second transmission using second TTI on a short Physical Downlink Shared Channel, sPDSCH.

6. The method of claim 5 wherein altering the at least one transmission comprises:
   configuring a choice between two short Physical Uplink Control Channel, sPUCCH resources, each being able to carry two information bits, where the wireless device can select at least one of the two sPUCCH resources.

7. The method of claim 5 wherein altering the at least one transmission comprises:
   responsive to the mapping specified for a Physical Uplink Control Channel, PUCCH, to a Physical Uplink Shared Channel, PUSCH, being reused for a short Physical Uplink Shared Channel, sPUCCH, introducing additional delay before receiving content of the mapped sPUCCH.

8. A wireless device comprising:
   at least one processor; and
   memory comprising instructions executable by the at least one processor whereby the wireless device is operable to:
      alter at least one transmission of a first transmission using a first Transmission Time Interval, TTI, and a second transmission using a second TTI where the second TTI is shorter than the first TTI, based on a determination that a collision is to occur between the first transmission and the second transmission, wherein determining that the collision is to occur comprises the wireless device being operable to determine that the collision is to occur between at least one of the group consisting of:
         the first transmission using the first TTI on a Physical Uplink Control Channel, PUCCH, and the second transmission using the second TTI on a short Physical Uplink Control Channel, sPUCCH;
         the first transmission using the first TTI on a Physical Uplink Shared Channel, PUSCH, and the second transmission using the second TTI on a short Physical Uplink Shared Channel, sPUSCH;
         the first transmission using the first TTI on the PUCCH and the second transmission using the second TTI on the sPUSCH; and
         the first transmission using the first TTI on the PUSCH and the second transmission using the second TTI on the sPUCCH.

9. The wireless device of claim 8 wherein determining that the collision is to occur comprises the wireless device being operable to determine that the collision is to occur between the first transmission using the first TTI on the PUCCH and the second transmission using the second TTI on the sPUCCH, and altering the at least one transmission comprises the wireless device being operable to:
   map a Hybrid Automatic Repeat Request, HARQ, feedback planned for the first transmission onto a first subframe using second TTI with an sPUCCH resource.

10. The wireless device of claim 8 wherein determining that the collision is to occur comprises the wireless device being operable to determine that the collision is to occur between the first transmission using the first TTI on the PUCCH and the second transmission using the second TTI on the sPUSCH, and altering the at least one transmission comprises the wireless device being operable to use similar rules as for a collision between a transmission on the sPUCCH and a transmission on the sPUSCH.

11. The wireless device of claim 8 wherein determining that the collision is to occur comprises the wireless device being operable to determine that the collision is to occur between the first transmission using the first TTI on the PUSCH and the second transmission using the second TTI on the sPUSCH, and altering the at least one transmission comprises the wireless device being operable to:
   responsive to the wireless device noticing an overlap before starting to transmit the first transmission using the first TTI on the PUSCH, dropping either the transmission of the PUSCH or the transmission of the sPUSCH.

12. A network node comprising:
   at least one processor; and
   memory comprising instructions executable by the at least one processor whereby the network node is operable to:
      alter at least one transmission of a first transmission using a first Transmission Time Interval, TTI, and a second transmission using a second TTI where the second TTI is shorter than the first TTI, based on a determination that a collision is to occur between the first transmission and the second transmission, wherein altering the at least one transmission comprises the network node being operable to:
         interpret a HARQ feedback received from a wireless device as corresponding to both a first transmission using first TTI on a Physical Downlink Shared Channel, PDSCH, and a second transmission using second TTI on a short Physical Downlink Shared Channel, sPDSCH.

13. The network node of claim 12 wherein altering the at least one transmission comprises the network node being operable to:
   configure a choice between two short Physical Uplink Control Channel, sPUCCH resources, each being able to carry two information bits, where the wireless device can select at least one of the two sPUCCH resources.

14. The network node of claim 12 wherein altering the at least one transmission comprises the network node being operable to:
   responsive to the mapping specified for a Physical Uplink Control Channel, PUCCH, to a Physical Uplink Shared Channel, PUSCH, being reused for a short Physical Uplink Shared Channel, sPUCCH, introduce additional delay before receiving content of the mapped sPUCCH.

15. The network node of claim 12 wherein altering the at least one transmission comprises the network node being operable to:
   anticipate a collision between a short Physical Uplink Control Channel, sPUCCH, and a Physical Uplink Shared Channel, PUSCH; and
   provide a sufficiently large allocation to map content of the sPUCCH to only a few Single-Carrier Frequency-Division Multiple Access, SC-FDMA, symbols of PUSCH.

* * * * *